United States Patent [19]

Dougherty et al.

[11] Patent Number: 4,918,145
[45] Date of Patent: Apr. 17, 1990

[54] PROCESS FOR PRODUCING A BLOCK COPOLYMER RESIN AND PRODUCT THEREOF

[75] Inventors: David J. Dougherty; Sunil B. Sarkar, both of Akron, Ohio

[73] Assignee: Bridgestone/Firestone, Inc., Akron, Ohio

[21] Appl. No.: 273,136

[22] Filed: Nov. 14, 1988

Related U.S. Application Data

[63] Continuation of Ser. No. 944,110, Dec. 22, 1986, abandoned.

[51] Int. Cl.[4] ........................................... C08F 297/04
[52] U.S. Cl. .................................... 525/271; 525/314
[58] Field of Search ................................ 525/314, 271

[56] References Cited

U.S. PATENT DOCUMENTS 3,937,760 2/1976 Cole et al. ............................. 525/314
4,098,980 7/1978 Markle et al. .......................... 525/94
4,530,967 7/1985 Shiraki et al. ......................... 525/314

Primary Examiner—Wilbert J. Briggs, Sr.
Attorney, Agent, or Firm—Frank J. Troy, Sr.

[57] ABSTRACT

A continuous process as disclosed which produces a clear, high impact block copolymer having a vinyl aryl monomer content of at least 70 percent of the block copolymer. This continuous process involves the continuous preparation of a multiblock copolymer which comprises the alternate feeding of monomer streams to a reaction zone wherein a product stream is withdrawn from the polymerization system at the same rate as the total rate of the feed streams.

15 Claims, No Drawings

PROCESS FOR PRODUCING A BLOCK COPOLYMER RESIN AND PRODUCT THEREOF

This is a continuation of application Ser. No. 944,110, filed Dec. 22, 1986, now abandoned.

BACKGROUND OF THE INVENTION

1. Field of the Invention

This invention is concerned with the production of clear, high impact block copolymers having a styrene content of at least 70 percent from a continuous process.

2. Related Prior Art

Block copolymers which are well-known for toughness and clarity have generally been prepared by batch systems. U.S. Pat. No. 3,937,760 first realized a process for producing a multiblock copolymer by a continuous process in which alternative different streams of comonomers are fed continually to a polymerization system with the flow of one stream being terminated when the other stream is being fed to the polymerization system. U.S. Pat. No. 3,937,760 is herein incorporated by reference.

STATEMENT OF THE INVENTION

The instant invention utilizes a continuous process to produce clear, high impact block copolymers having a vinyl aryl monomer content of at least 70 percent of the block copolymer. This continuous process produces a block copolymer in the form of a stable suspension in a aliphatic solvent. Polymer in the form of suspension can be produced at much higher concentrations than polymers formed in solution.

The preferred product produced by the present continuous process is by nature (1) a blend of block polymers having a styrene content of at least 70 percent with (2) individual homopolymers or copolymers which are charged into the system. The number of blocks of the polymers of the blend range from two to about ten with the average number of blocks usually being controlled to be around four to six blocks. This product being a mixture of block polymers nonetheless exhibits superior properties of toughness, flexibility and clarity whether it is extruded as a sheet for packaging or molded into various shapes.

The instant blends of block copolymers which are produced may be further blended with from 0 to 80% by weight of homopolymer resins such as polystyrene to produce blends which possess advantageous properties such as toughness and clarity.

DETAILED DESCRIPTION OF THE INVENTION

It has been found that when a continuous multiblock polymerization process is utilized and the multiblock polymer contain between 70 and 85 percent vinyl aryl contributed blocks a product having properties which has never before been produced is unexpectedly obtained.

The novel block copolymers of the instant invention are made by a continuous process in which alternate different streams of comonomers are fed continually to a polymerization system, the flow of one stream being terminated while the other stream is being fed to the polymerization system. The reaction mixture is agitated very efficiently to insure quick and uniform distribution of the monomers and initiator or catalyst. Initiator is added to the polymerization system either intermittently or continually at a rate such that the proportion of initiator based on the monomer concentration is such as to give the desired molecular weight in the resultant block copolymer. The polymerization product is flowed from the reaction system at the same rate as the total of the feed streams. The average number of blocks in the resultant multiblock copolymer is determined by the number of alternate cycles of feed stream effected during the residence period in the polymerization system. The molecular weight equivalent of each block is determined by the period of flow of the stream of monomer producing such block, provided the concentration of monomer in the monomer feed is constant.

The product of this process is by nature a blend of block polymers and also the individual homopolymers or copolymers which are charged. The number of blocks of the polymers of the blend range from two to about ten preferably controlled to between four and six blocks. The term monomer as used herein refers to either a monomer or a comonomer which may be charged.

Depending on the polymerization rate, the change of repeating units from one block of monomer to the other monomer repeating units may be gradual in accordance with how long it takes to use up the first monomer remaining after the flow is terminated and flow of the second comonomer is initiated. This also depends somewhat on the relative polymerization tendencies of the two comonomers. For example with butadiene and styrene, in the presence of each other the butadiene polymerizes much more quickly than the styrene. Therefore when the butadiene flow is terminated and the styrene feed initiated, the butadiene will still polymerize more rapidly and probably be consumed before the styrene polymerization is initiated. Or it is possible that for a brief interim period there may be random copolymerization of the comonomers. This brief intermediate random copolymerization between respective blocks may not be objectionable since they generally produce little or no change in the properties of the resultant copolymers.

However, if it is desired to avoid this brief period of random copolymerization, this can be effected either by a short delay before initiating the flow of the next monomer or by interjecting a stream of diluent, preferably the same as used in the monomer streams, between the termination of the first monomer stream and the initiation of the flow of the second monomer stream. This stream of diluent should be continued only as long as required to complete polymerization of the first monomer. Subsequently after termination of the second monomer, it may be desirable to interject another stream of diluent before introduction of the next stream of monomer.

However, it may be desirable to interject such a stream of diluent only between streams of monomer where the monomer whose flow has just been terminated has a much slower tendency to polymerize than the monomer whose flow is about to be initiated. In such case the flow of diluent gives such slower monomer sufficient time to polymerize before the faster polymerizing monomer is introduced. In the reverse case where the flow of the faster polymerizing monomer is being terminated and the flow of the slower polymerizing monomer is about to be initiated, an intermediate diluent flow is not as important since the faster monomer may continue to complete polymerization in the presence of the slower monomer. In most cases, however, it is found that the abrupt change from one monomer stream to the other does not effect sufficient changes in properties of the ultimate multiblock copolymer that it is necessary to interject such diluent streams.

The monomers which are useful in the practice of this invention include anionic polymerizable compounds such as at least one vinyl aryl compound such as styrene, alphamethyl styrene, vinyl toluene, vinyl naphthalene, alphamethylvinyl toluene, vinyl diphenyl, and corresponding compounds in which the aromatic nucleus may have other alkyl derivatives up to a total of 8 carbon atoms or may have chlorine attached to the aromatic nucleus such as p-chloro-styrene m-chlorostyrene; 4-chloro-1-vinyl-naphthalene, and the like. Copolymerizable block monomers include dienes such as butadiene-1,3, isoprene, piperylene, chloroprene, and other dienes having up to 8 carbon atoms. Any combination of such comonomers may be used in the practice of the invention.

The final multiblock polymer necessarily must contain between 70 and 85 percent vinyl aryl contributed blocks in the finally recovered product to produce the unique feature of the final product. These multiblock polymers can also be polyblended with additional vinyl aromatic polymers such as general purpose polystyrene high impact polystyrene and styrene-methacrylate copolymers and maintain superior toughness and clarity characteristics. Typically the multiblock polymers can be blended with 0 to 80 percent of these polymers.

As previously indicated, the molecular weight of the resultant copolymer is determined by the concentration of initiator used in proportion to the total amount of monomer polymerized. This is in accordance with the well known principle that each molecule of initiator produces one molecule of polymer and that the amount of monomer gives as many polymer molecules as there are molecules of initiator. Therefore, the average molecular weight of the product may be obtained by dividing the total number of monomer molecules by the number of initiator molecules.

A "block" of repeating units is generally defined as a sequence or series of eight or more identical repeating units connected to each other. Analyses for block polymers may be made by various methods known in the art. For example, analysis for polystyrene may be made by oxidation with osmium tetraoxide according to the procedure published in Jour. Polymer Sci., Vol. 1, No. 5, P. 429, (1946).

In the process of this invention there may be as few as two blocks but it is generally advantageous to produce copolymers having at least three blocks and preferably at least five blocks. In many cases as many as fifteen or twenty blocks may be desired. It will be noted by those skilled in the art that this unique process can produce polymers tending to begin or end with desirable blocks, as selected by the investigator and produced by appropriate selection of the stages in the cycle.

One or more of the individual feed streams which include diluent, initiator and monomers may be continuously fed to the reactor while one or more feed streams may be cycled on and off.

The initiator used in the polymerization is a compound containing a carbon-lithium or carbon-sodium linkage. This includes compounds corresponding to the formulas RLi and RNa, where R is an aliphatic, cycloaliphatic or aromatic hydrocarbon radical containing from 1 to 20 carbon atoms. Among the many compounds suitable for this purpose are methyllithium, ethyllithium, isopropyllithium, n-butyllithium, sec.-butyllithium, t-butyllithium, amyllithium, hexyllithium, p-octyllithium, n-decyllithium, cyclohexyllithium, allyllithium, methallyllithium, phenyllithium, naphthyllithium, p-tolyllithium, p-butylphenyllithium, 4-phenylbutyllithium and the corresponding sodium compounds. Compounds containing two or more such carbon-metal linkages may also be used, such as dilithium butane, polylithium polymers, etc. Mixtures of two or more of the above may be employed. Particularly preferred is n-butyllithium.

Theoretically, each molecule of initiator produces a molecule of polymer so the initiator level should be the reciprocal of the desired molecular weight in moles of initiator per mole of reactive monomer. In general, however, from 0.01 to 10 millimoles of initiator is required per mole of monomer to be polymerized, preferably from 0.05 to 10 millimoles of initiator per mole of monomer.

An amount of initiator is added at the beginning or with the initial stream of monomer to begin the polymerization and in a proportion to give the desired molecular weight. Thereafter initiator is added either intermittently or continually to replace the amount lost in the exit stream. This subsequent addition may be performed during the flow of either or both monomer streams.

In the polymerization system, it is especially important to exclude materials harmful to the initiator. These materials include water, oxygen, carbon dioxide and other similar materials which "kill" or deactivate the initiator. Preferably the incoming monomers and diluent are treated to remove such impurities prior to introduction to the polymerization system.

The diluent is an aliphatic hydrocarbon of 5–10 carbon atoms which is inert to the initiator employed. The diluent can be one in which the polymer is soluble or partly soluble, or in which the copolymer may be suspended. Pentanes, hexanes, and heptanes are preferred as diluents, especially hexane. Mixtures of these diluents may also be used.

From 200 to 900 parts by weight of diluent per 100 parts of monomer is generally sufficient to yield a fluid polymer solution or suspension which can be easily handled.

The temperature of the polymerization mass should be maintained between 50° and 175° C., preferably 75°–150° C., in order to produce a fast rate of polymerization, and preferably is maintained at a relatively constant temperature throughout the course of the reaction period.

Polymerization is advantageously performed in an agitated, pressurized reactor which may be jacketed to allow for temperature control. Pressures are generally autogenous, although inert gases can be charged to the reactor to increase the pressure, if desired. Dry nitrogen, argon, helium or other inert gas can be used for this purpose. Normally pressures will be atmospheric or above, and can be as high as 10 atmospheres or more. The outlet for the exit flow of reaction mixture out of the reactor is advantageously located at a point remote from the inlets for the streams of monomer and catalyst.

The polymer product is posttreated according to regular procedures in such cases, preferably dropping the product solution into methanol or isopropanol containing antioxidant, to deactivate the initiator and to precipitate the copolymer which is then separated and dried before analysis and testing. Water may also be used as a terminator.

The block copolymer products which are prepared by the instant invention are clear and possess high impact strength for thermoforming. These products are especially useful for the production of packaging, drinking cups, food containers, toys and other thermoformable articles.

The invention is illustrated by the following examples. These examples are given merely for purposes of illustration and are not intended in any way to restrict the scope of the invention nor the manner in which it can be practiced. Unless specified otherwise, parts and percentages are given by weight.

EXAMPLE I

A 1.7 gallon stainless steel reactor is used in continuous anionic polymerization. A semi-continuous outflow of product was achieved by the following repeated charge sequence of (1) 0.082 Kg of 1,3-butadiene and 0.166 Kg of hexane over 5 minutes, then, (2) 0.205 Kg of styrene and 0.041 Kg of hexane over 7.9 minutes, then (3) 0.123 Kg of 1,3-butadiene and 0.41 Kg of styrene and 1.07 Kg of hexane over 32.5 minutes, followed by a 5 minute pause, and finally (5) 0.50 Kg of hexane over 9.7 minutes. Catalyst is continuously added over the entire first 5 minutes of (1) and the first 4 minutes of (2) at the rate of 0.00053 Kg for the 9 minute period.

The rate of addition was such that the average residence time in the reactor was approximately 2 hours resulting in two cycles per residence time and therefore, an average of six blocks per polymer chain. The polymerization temperature was 240° F.

The block polymer mixture formed in the reactor was a stable suspension in the solvent. The reaction product flowed out of the reactor continuously accept during the 5 minute pause. After polymerization was completed, the living polymer was flowed through a second live line to assure over 99% conversion and was then terminated continuously with a solution of 0.00082 Kg of boric acid in 0.0164 Kg of water. Antioxidants, namely BHT and PNPP were added to the recovered polymer before drying. The suspension was dried using a 12 inch laboratory drum dryer and the dry polymer was tested as is and was blended with 50% of general purpose polystyrene (GPPS) and tested. Results of these tests are displayed in Table 1.

EXAMPLE II

The procedure was used in accordance with Example I except the repeated charge sequence was (1) 0.2 Kg of 1,3-butadiene and 0.41 Kg of styrene were added over 34 minutes, then (2) 0.2 Kg of styrene was added over 11 minutes, followed by a 5 minute pause, then (3) 0.5 Kg of hexane was added over 10 minutes.

N-butyllithium catalysts was added continuously in the amount of 0.00053 Kg for the 45 minute charge cycle of (1) and (2). The addition rates were set to yield one full sequence per hour and a two hour average residence time, thus producing an average of four blocks per polymer chain. The resulting product was a semi-stable suspension in the solvent settling out slowly if not agitated but remixable upon agitation. The polymer was recovered and treated as in Example I and tested. The results of the tests are displayed in Table I.

COMPARATIVE EXAMPLE I

A comparative tapered diblock polymer was produced by batchwise polymerization as disclosed in U.S. Patent No. 4,220,738. A vessel and charge streams were prepared in a manner similar to Example I and the following materials were charged into the vessel: 0.41 Kg of 1,3-butadiene, 1.23 Kg of styrene, 5.0 Kg of hexane and 0.00106 Kg of n-butyllithium. The batch was allowed to polymerize at 240° F. for 2.5 hours to achieve over 99 percent conversion. The resultant block polymer was very unstable as a suspension in the solvent. The polymer settled out rapidly and was difficult to redisperse. The polymer was recovered and treated as in Example I and tested. The results of the tests are displayed in Table 1.

In the following table the RAW POLYMER was recovered from the suspension and tested. The melt index was determined by ASTM D1238-6ST, 200° C., 5 kg load (gms/10 mins). The block styrene content was determined by osmium tetroxide degradation (British patent 1,415,718). GPC represents Gel Permeation Chromatography. Under the heading EXTRUDED AND FORMED POLYMER each polymer was extruded and formed into an 18 mil sheet to test their performance in applications such as blister packs. Under the heading INJECTION MOLDING each polymer was injection molded using a Battenfield laboratory injection molding machine to test performance of injection molded applications such as toys. Under the heading POLYMER BLENDED 50/50 GPPS each polymer was blended with an equal weight amount of general purpose polystyrene and extruded into 18 mil sheets to test performance in thermoforming applications such as drinking cups.

TABLE I

| | EXAMPLE I | EXAMPLE II | COMPARATIVE EXAMPLE I |
|---|---|---|---|
| RAW POLYMER | | | |
| MELT INDEX | 9.6 | 11.3 | 5.5 |
| BOUND STYRENE | 77.0 | 76.9 | 75.8 |
| BLOCK STYRENE | 55 | 58 | 61 |
| GPC - Mw | 111,000 | 106,000 | 134,000 |
| Mn | 40,000 | 52,000 | 94,000 |
| Mw/Mn | 2.77 | 2.04 | 1.4 |
| EXTRUDED AND FORMED POLYMER | | | |
| MIT FLEX | 1,000+ | 539 | 130 |
| TRANSMISSION HAZE | 2.0 | 10.6 | 4.6 |
| GLOSS | 100+ | 100+ | 100+ |
| HARDNESS, SHORE "D" | 66 | 66 | 66 |
| INJECTION MOLDED | | | |
| IZOD (unnotched at room temp - ft - lbs/in) | did not break | did not break | 4.3 |
| IZOD - (notched at room temp - ft - lbs/in) | 0.61 | 0.41 | 0.33 |
| TENSILE YIELD (psi) | 2550 | 3350 | ? |
| TENSILE @ BREAK (psi) | 1767 | 2083 | 4133 |
| ELONGATION @ BREAK (%) | 200 | 57 | 10 |
| FLEXURAL MODULUS (psi × 105) | 1.25 | 1.50 | 1.59 |
| TRANSMISSION HAZE | 5.1 | 27 | 7.7 |
| GLOSS | 100+ | 100+ | 100+ |
| HARDNESS, SHORE "D" | 67 | 67 | 68 |
| POLYMER BLENDED 50/50 GPPS | | | |

TABLE I-continued

| | EXAMPLE I | EXAMPLE II | COMPARATIVE EXAMPLE I |
|---|---|---|---|
| GARDNER IMPACT (lbs) | 2.4 | 5.3 | 0.40 |
| MIT FLEX | 1180 | 432 | 0 |
| GLOSS | 100+ | 100+ | 100+ |
| TRANSMISSION HAZE | 4.2 | 6.8 | 3.6 |
| HARDNESS, SHORE "D" | 80 | 78 | 80 |

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims:

We claim:

1. A stable or semi-stable suspension in aliphatic diluent of clear, high impact multiblock copolymer comprised of block monomer units of vinyl aryl containing monomer units and conjugated diene containing monomer units wherein the block copolymer contains a vinyl aryl content in an amount exceeding about 75% and ranging to 85% percent of the total monomer content which is formed from substances consisting of vinyl aryl containing monomer, conjugated diene monomer, aliphatic hydrocarbon diluent and anionic polymerization catalyst with or without the use of inert pressurizing gas by the steps of preparing the block copolymer in a continuous stream comprising:
   (1) alternately feeding into a highly agitated polymerization system a first monomer composition from the first monomer stream, differing in monomer composition from the first monomer stream, each monomer stream being interrupted while the other monomer stream is flowed, and repeating continually the feeding of said alternating streams, (2) adding to the polymerization system an anionic polymerization catalyst capable of polymerizing each of said monomers at a rate to cause polymerizing to form said copolymer at a desired molecular weight, said polymerizing being carried out in aliphatic hydrocarbon diluent to produce said copolymer in stable or semi-stable suspension in said diluent as a product, (3) withdrawing from said polymerization system a product stream at the same rate as the total of said feed streams whereby there is substantially continual flow through said polymerization system.

2. The suspension of claim 1 prepared in a process which the size of each block in the resultant multiblock copolymer is controlled by the concentration and the length of the respective periods of flow and the said monomers, a longer period of flow of a stream of fixed concentration of particular monomer producing a higher molecular weight equivalent in the corresponding block of that monomer.

3. The suspension of claim 1 prepared in a process in which the number of blocks in the resultant multiblock copolymer is controlled by the number of alternating monomer feed steps that are performed during the residence time in said polymerization system.

4. The suspension of claim 1 prepared in a process in which a single monomer is used in each monomer stream.

5. The suspension of claim 1 prepared in a process in which the vinyl aryl monomer is styrene.

6. The suspension of claim 1 prepared in a process in which the conjugated diene is butadiene.

7. The suspension of claim 6 prepared in a process in which the anionic catalyst is n-butyl lithium.

8. The suspension of claim 1 in which there are at least three alternate feedings of monomer during the residence period in said system.

9. The suspension of claim 1 in which a third monomer stream differing in monomer composition from each of said first and second monomer streams is fed into said polymerization system after each feeding of said second monomer stream and prior to each repetition of the feeding of said first monomer stream.

10. The suspension of claim 1 in which at least one of said monomer streams is a mixture of at least two copolymerizable monomers.

11. The suspension of claim 1 in which one or more feed streams are fed continuously to the reactor and one or more feed streams are cycled on and off.

12. A suspension as recited in claim 1 wherein said diluent is selected from the group consisting of pentanes, hexanes and heptanes.

13. A suspension as recited in claim 12 wherein said diluent is hexane.

14. A suspension as recited in claim 1 wherein said substances consist of styrene, 1,3-butadiene, hexane and n-butyllithium.

15. A stable or semi-stable suspension in aliphatic diluent of clear, high impact multiblock copolymer comprised of block monomer units of vinyl aryl containing monomer units and conjugated diene containing monomer units wherein the block copolymer contains a vinyl aryl content in an amount exceeding about 75% and ranging to 85 percent of the total monomer content which is formed in the absence of added dispersing agent by the steps of preparing the block copolymer in a continuous stream comprising: (1) alternately feeding into a highly agitated polymerization system a first monomer stream, and then a second monomer stream, differing in monomer composition from the first monomer stream, each monomer stream being interrupted while the other monomer stream is flowed, and repeating continually the feeding of said alternating streams, (2) adding to the polymerization system an anionic polymerization catalyst capable of polymerizing each of said monomer at a rate to cause polymerizing to form said copolymer at a desired molecular weight, said polymerizing being carried out in aliphatic hydrocarbon diluent to produce said copolymer in stable or semi-stable suspension in said diluent as a product, (3) withdrawing from said polymerization system a product stream at the same rate as the total of said feed streams whereby there is substantially continual flow through said polymerization system.

* * * * *

UNITED STATES PATENT AND TRADEMARK OFFICE
CERTIFICATE OF CORRECTION

PATENT NO. : 4,918,145

DATED : April 17, 1990

INVENTOR(S) : David J. Dougherty; Sunil B. Sarkar

It is certified that error appears in the above-identified patent and that said Letters Patent is hereby corrected as shown below:

Claim 1, lines 15 and 16, following the word monomer in line 15, delete the phrase: "composition from the first monomer".

Claim 1, line 16, after the comma following the word stream, insert the phrase; --and then a second monomer stream,--

Claim 2, line 1, after the word process insert the word --in--

Claims 8, 9, 10, and 11, line 1 of each claim, following the numeral 1, insert the phrase: --prepared in a process--

Claim 15, line 19, the word "monomer" should read --monomers--

Signed and Sealed this

Third Day of September, 1991

*Attest:*

HARRY F. MANBECK, JR.

*Attesting Officer*    *Commissioner of Patents and Trademarks*